United States Patent

Bartholdy

[11] Patent Number: 5,368,722
[45] Date of Patent: Nov. 29, 1994

[54] VOID GRADING

[75] Inventor: Jesper Bartholdy, Bronshoj, Denmark

[73] Assignee: Haldor Topsoe A/S, Denmark

[21] Appl. No.: 76,577

[22] Filed: Jun. 14, 1993

[30] Foreign Application Priority Data

Jun. 30, 1992 [DK] Denmark ............... 0861/92

[51] Int. Cl.$^5$ ............ C10G 35/04; C10G 45/00
[52] U.S. Cl. .................. 208/149; 208/146; 208/216 PP; 208/254 H; 502/527
[58] Field of Search ......... 208/251 H, 216 R, 216, 208/134, 118, 120, 121, 112, 146, 149, 216 PP, 254 H; 252/449, 461; 502/209, 527, 211, 255

[56] References Cited

U.S. PATENT DOCUMENTS

| | | | |
|---|---|---|---|
| 3,898,180 | 8/1975 | Crooks et al. | 252/449 |
| 4,558,028 | 12/1985 | Tsuneki et al. | 502/211 |
| 4,828,683 | 5/1989 | Gardner et al. | 208/216 R |
| 4,830,736 | 5/1989 | Hung et al. | 208/251 H |
| 5,017,542 | 5/1991 | Martan et al. | 502/209 |
| 5,198,579 | 3/1993 | Honda et al. | 562/535 |
| 5,206,431 | 4/1993 | Hashiba et al. | 562/534 |

FOREIGN PATENT DOCUMENTS 0476938  3/1992  European Pat. Off. .

*Primary Examiner*—Asok Pal
*Assistant Examiner*—Bekir L. Yildirim
*Attorney, Agent, or Firm*—Ostrolenk, Faber, Gerb & Soffen

[57] ABSTRACT

Process for the hydrotreating of a hydrocarbon feedstock, wherein the feedstock is passed through a fixed bed catalyst system of a hydrotreating catalyst comprising a physical mixture of high void catalyst particles and low void catalyst particles, which particles are mixed in different amounts in different layers of the catalyst bed so as to obtain within the fixed bed catalyst system a layered structure with different layers having different mixing ratios of the high and low void particles.

5 Claims, 5 Drawing Sheets

VOID GRADING

BACKGROUND OF THE INVENTION

Generally, the present invention relates to a fixed bed catalyst system for use in hydrotreating processes, and, in particular, a catalyst system comprising a physical mixture of catalyst particles with a large void and particles with a low void.

Hydrotreating of crude feedstocks encounters frequently problems caused by solid contaminants in the feedstock.

In many refineries, serious problems arise in hydrotreating reactors showing liquid maldistribution and pressure drop build-up due to plugging of the reactors by those solid contaminants.

If solid material of certain particle size is present in a feed-stock, it will deposit in the catalyst bed. An appropriate grading technology is necessary in order to control the deposition in such a way that the life of the catalyst charge is determined by lack of catalyst activity rather than flow restrictions or reactor plugging. Traditionally control of reactor contamination have been made by applying a grading of large particles on top of smaller particles. Both particle sizes used have almost the same void fraction, but the average size of the void spaces are different and the ability to retain deposits is thus different. By such a grading procedure, the deposits are allowed to penetrate deeper in the bed, and a higher contaminant uptake can, therefore, be attained before the catalyst bed is plugged off. The particle size procedure has the obvious draw back that the part of the reactor, where the accumulation occurs, has a limited capacity for contaminant storage. Exchange of large low void material with high void material, e.g. rings in the reactor top, have to a large extent improved the capacity for contaminant storage without having bed plugging. However, situations exists where the size of the contaminant particles is small and/or the feedstock contaminant level is high, and where a layer of large particles/high void material does not have adequate ability to retain contaminants and plugging of subsequent layers can thus occur unless very large volumes of large particles/high void material are used.

SUMMARY OF THE INVENTION

Based on the above observations, improved control of deposition of solid material in a fixed catalyst bed over a larger volume in the bed is obtained by appropriate void grading of the catalyst bed with catalyst particles having different void and optionally different activity. I have found that appropriate void grading is obtained by physically mixing catalyst particles providing a large void volume and particles providing a low void volume in different mixing ratios in fixed bed catalyst system, and, thereby, improving performance of, in particular, hydrotreating reactors.

Accordingly, this invention provides a process for the hydrotreating of a hydrocarbon feedstock, wherein the feedstock being passed through a fixed bed catalyst system of a hydrotreating catalyst comprising a physical mixture of high void catalyst particles and low void catalyst particles, which particles are mixed in different amounts in different layers of the catalyst bed so as to obtain within the fixed bed catalyst system a layered structure with different layers having different mixing ratios of the high and low void particles.

Suitable catalyst particles for use in the invention comprise particles in the shape of cylinders, threelobes, spheres and similar compact bodies with a low void. Catalyst particles having a large void are typically selected from rings, wagon wheels and bodies with a plurality of internal channels. The active catalytic material supported on those particles comprises Group VI metals, in particular molybdenum and/or tungsten, and Group VIII metals, preferably nickel and/or cobalt.

THE DRAWINGS

In the drawings appended hereto:

DESCRIPTION OF THE PREFERRED EMBODIMENTS

EXAMPLE 1

Catalyst particles of two different shapes were mixed thoroughly using a rifle divider. A number of different mixing ratios were used ranging from 0 to 100 wt % rings mixed with threelobe particles dried at 250° C. for two hours before mixing. After mixing, the particles were dried again and the bulk densities were determined using the ASTM D4180-82 method.

In the experiment the following catalyst types were used, which are commercially available from Haldor Topsøe A/S, Denmark:

⅜" ring TK 551 (ringshaped particles)
1/16" TL TK 551 (threelobeshaped particles)

The size of the threelobe particles was selected so that no threelobe particle could enter the holes of the rings.

Figure 1:
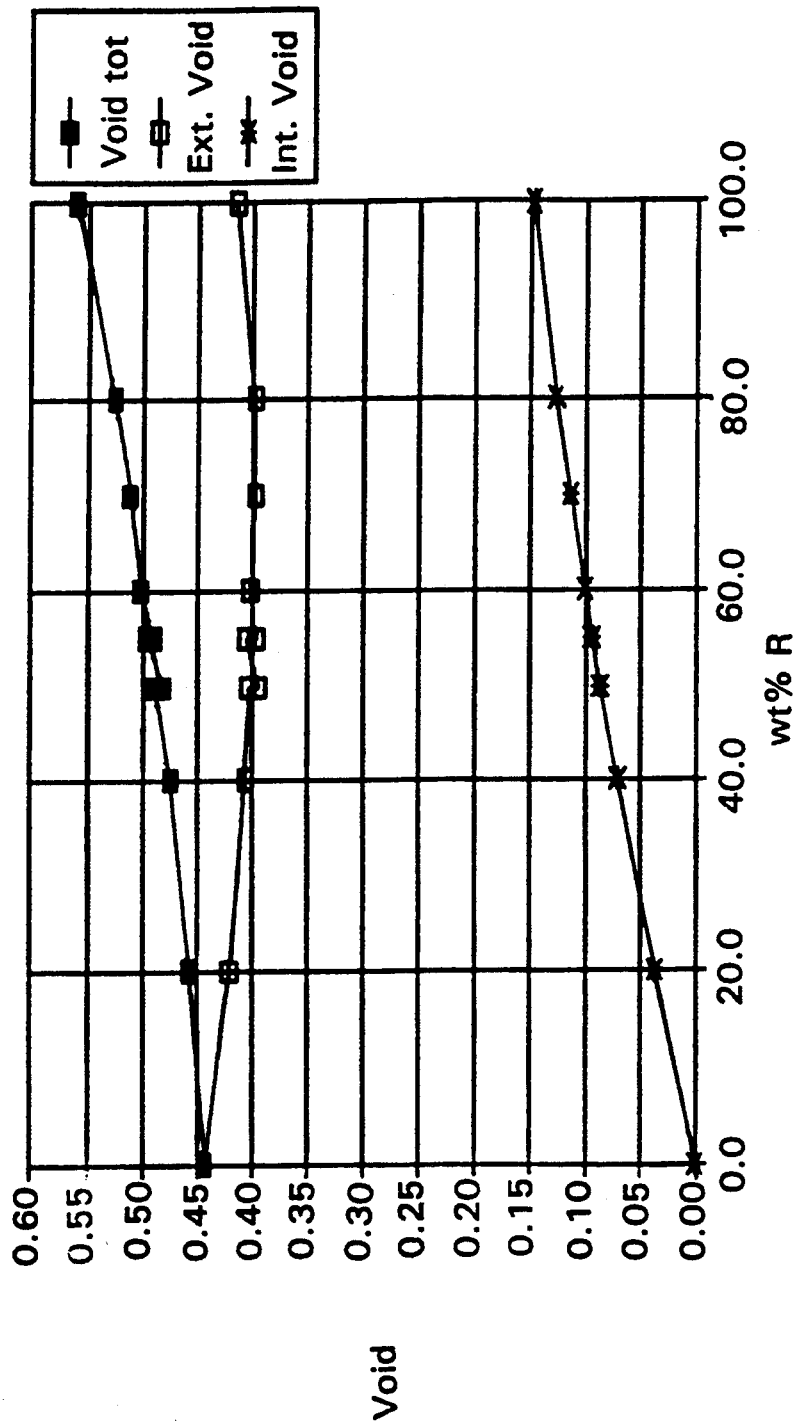
FIG. 1 shows graphically the result of the bulk density determinations in Example 1, and the table, infra.

FIG. 1 shows graphically the results of the bulk density determinations. From the bulk densities measured and the particle density data, the void volume was determined for the various samples. FIG. 1 gives a graphical presentation of the data in Table 1. As apparent from FIG. 1, the increase in the void volume by increasing the percentage of rings in the mixture, deviates from a straight line. This indicates that the small particles have a tendency to fill the interstices between the larger particles. This phenomenon is further illustrated if the void volume is specified by:

$E_i$: Void volume in the holes of the rings, internal void.
$E_y$: Void volume, i.e. interstices in between the particles, external void.

| Void Volume Calculation/Mixtures of Ringshaped and Threelobe Particles | |
|---|---|
| Particle density | 1.28 |
| Outer ringradius (ry)/inner ringradius (ri) | 2 |
| Length void | 0.42 cm |
| Area threelobe | 0.014213 cm² |
| Inner ringradius | 0.08 cm |
| Length ring | 0.54 cm |
| Length threelobe | 0.42 cm |

| wt % rings/ | Filling- | No. of |

-continued

Void Volume Calculation/Mixtures of Ringshaped and Threelobe Particles

| mixture | Density | Etot | Ey | Ei | part. /g | rc | rs |
|---|---|---|---|---|---|---|---|
| 100 | 0.56 | 0.560 | 0.414 | 0.147 | 24.0 | 2.70 | 2.84 |
| 80 | 0.61 | 0.524 | 0.397 | 0.127 | 45.4 | 1.85 | 2.21 |
| 70 | 0.63 | 0.511 | 0.397 | 0.114 | 56.1 | 1.64 | 2.04 |
| 60 | 0.64 | 0.501 | 0.401 | 0.100 | 66.7 | 1.50 | 1.92 |
| 55 | 0.65 | 0.490 | 0.396 | 0.094 | 72.1 | 1.42 | 1.85 |
| 55 | 0.65 | 0.496 | 0.404 | 0.092 | 72.1 | 1.44 | 1.87 |
| 50 | 0.67 | 0.480 | 0.394 | 0.087 | 77.4 | 1.35 | 1.79 |
| 50 | 0.66 | 0.488 | 0.403 | 0.085 | 77.4 | 1.38 | 1.81 |
| 40 | 0.67 | 0.475 | 0.405 | 0.070 | 88.1 | 1.28 | 1.72 |
| 20 | 0.70 | 0.456 | 0.420 | 0.036 | 109.5 | 1.15 | 1.60 |
| 0 | 0.71 | 0.442 | 0.442 | 0.000 | 130.9 | 1.06 | 1.53 | rc: Average voidradius in mm - cylindrical void;
rs: Average voidradius in mm - spherical void;
Total void: Etot = 1-1/δbulk
Inner void: Ei = (wt % ring)/100/δpart · (1/((ry/ri)$^2$ − 1)) · δbulk
Outer void: Ey = Etot - Ei The values of $E_i$ and $E_y$ at different mixing ratio are summarized in Table 1 and shown in FIG. 1. $E_y$ has its maximum value of 100% rings or 100% threelobe in the mixture. Furthermore, $E_y$ has a minimum value indicating that small particles tend to fill the void among larger particles.

It is not possible to make an exact calculation of the average size of the void volume. However, certain assumptions, concerning the shape of the voids as well as the number of voids, make it possible to determine the average size of the void volume, when assuming that:

the number of voids in a catalyst bed is equal to the number of catalyst particles, and voids are either cylindrical with a length equal to the average length of the shortest catalyst particle type (the threelobe) or sphere.

Figure 2:
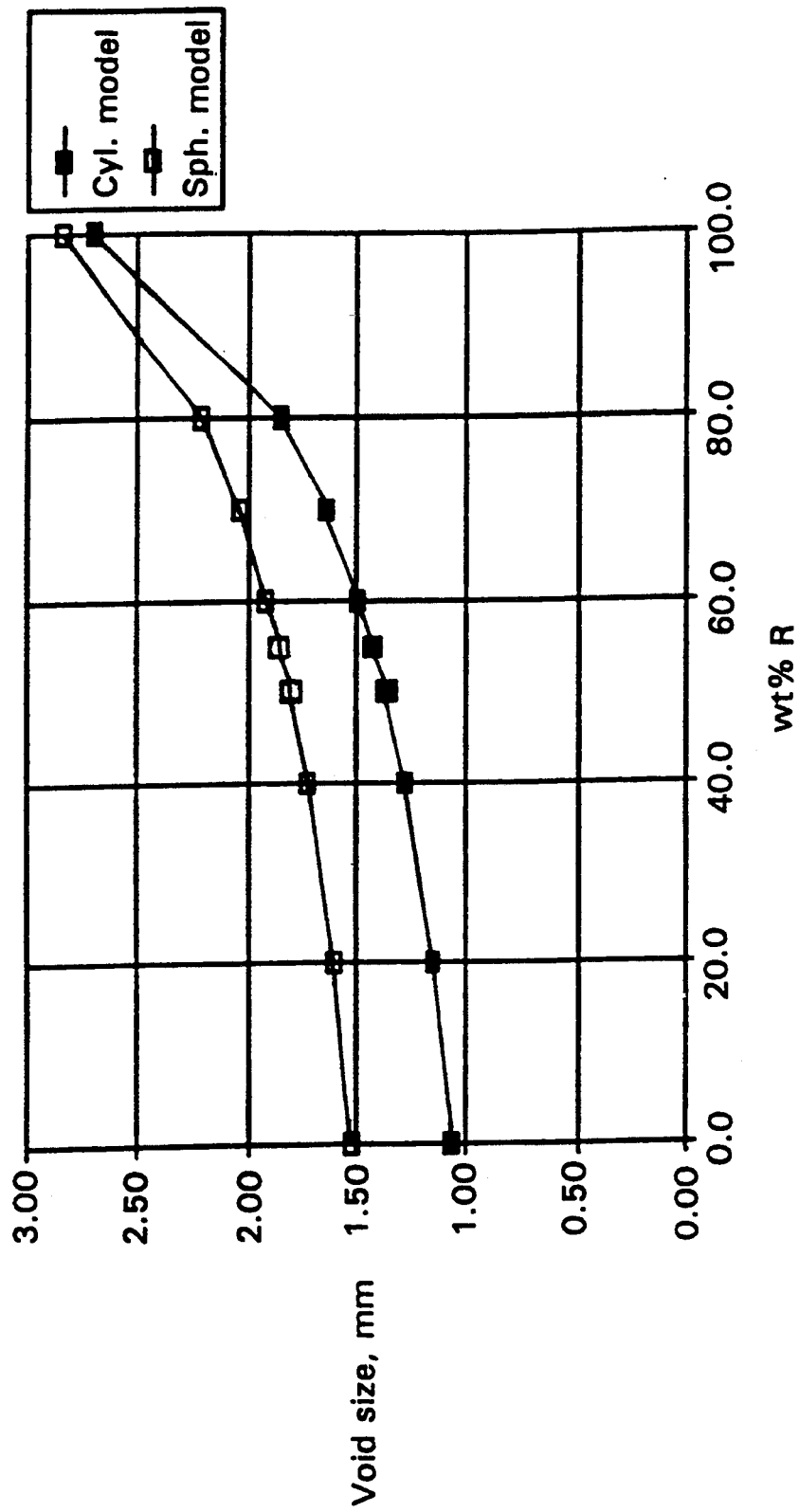
FIG. 2 shows the average size of the void volumes calculated from that data.

Based on the above assumptions, the average size of the void volume has been calculated, the results of these calculations are illustrated in FIG. 2. As apparent from FIG. 2, the change in the total void volume for a given addition of rings to the mixture is different, depending on the composition of the mixture. At low percentages of rings, an addition of rings only gives a minor increase in the average size of void volume, whereas at high percentages of rings (>60%), a given addition of rings gives a high increase in void volume.

It is indicated by the above results that void graded catalyst systems are useful in industrial units, since void grading allows both a smooth change from high void material (rings) to low void material (threelobes) and provides a smooth change in filtering effect. The filtering effect is improved through small voids in the graded catalyst bed by addition of a small fraction of low void particles, e.g. threelobes to the ringshaped particles, which reduces the average size of the void significantly. Void grading is preferably obtained by mixing of ringshaped particles and threelobes. A void graded catalyst bed with maximum distribution of the filtering effect is provided within a void graded catalyst bed having layers of 100, 85, 60, 0 wt % ringshaped particles mixed with threelobe particles.

In such a bed, the amount of contaminants removed from a feedstock through deposition on particles is found to be of a first order with respect to the feedstock contaminant level C (kg/m$^3$):

$$-\lambda C = \delta C/\delta L \quad (1)$$

Integration of eq. 1 over the length of a plug flow reactor gives:

$$C = C_0 \cdot EXP(-\lambda \cdot L) \quad (2)$$

where L is the distance from the reactor top in m, $C_0$ and C is the contaminant concentration at the inlet end at a distance of L meters from the reactor top in kg/m$^3$, and $\lambda$ is the filtration coefficient in m$^{-1}$.

Solid contaminants are deposited in a characteristic fashion in the reactor. Using eq. 2, an equation can be derived that relates the deposited amount to the filtration coefficient:

$$\sigma = C_0 \cdot Q \cdot t \cdot \lambda / A \cdot EXP(-\lambda \cdot L) \quad (3)$$

In eq. 3 $\sigma$ is the amount of solids (kg/m$^3$ catalyst) retained in the catalyst layer L meters from the reactor bed. Q is the liquid flow to the reactor (m$^3$/h), t is the total time on stream (hours), and A is the cross section area of the reactor (m$^2$).

By means of the above equations, solid deposition in a number of different catalyst graded systems were calculated. In the model experiments, a fixed flow rate and suspension amount have been assumed.

Comparison Example A

Figure 3:
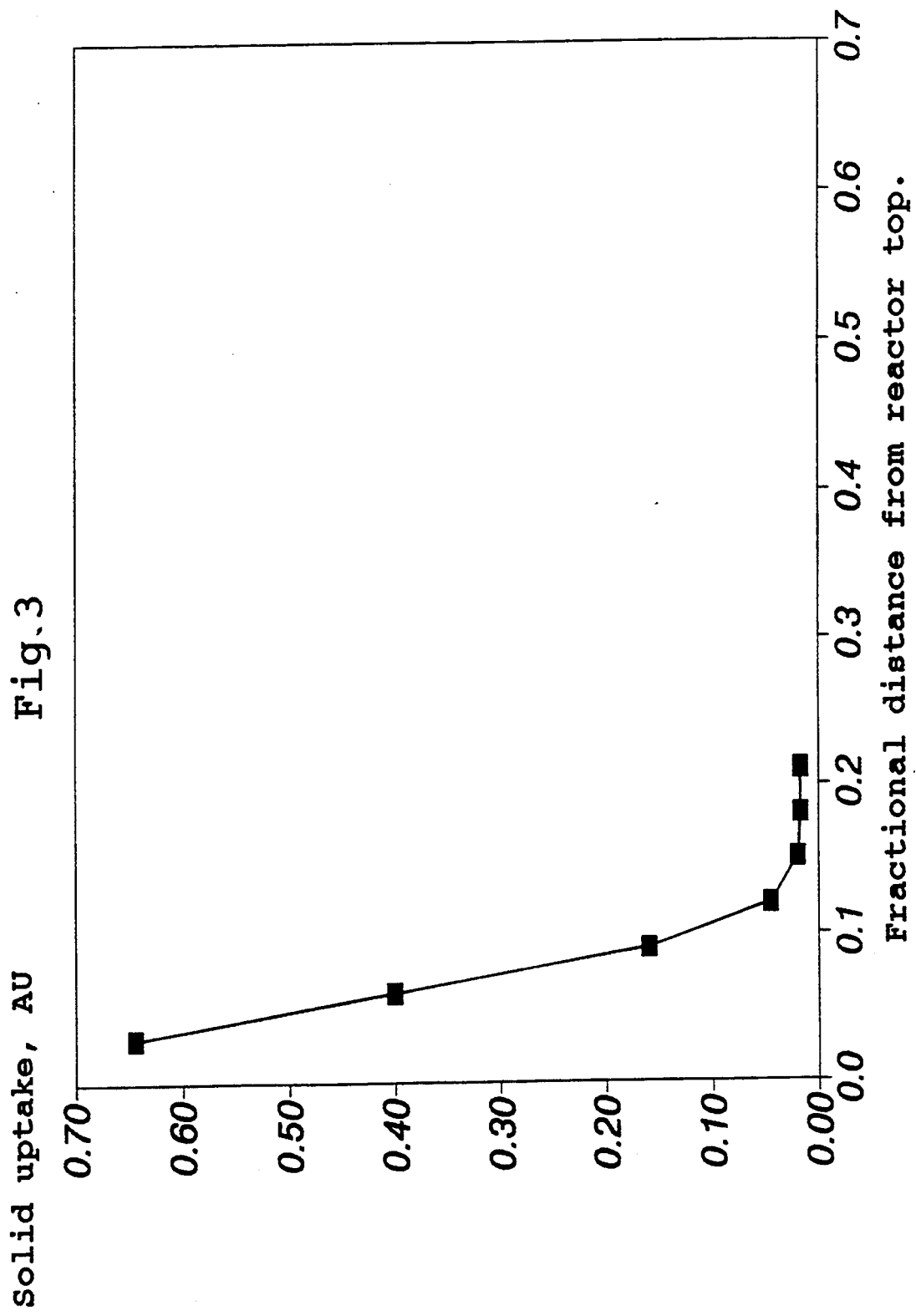
FIG. 3 shows the solids deposition profile in a catalyst bed consisting of 1/16" threelobe particles.

The catalyst bed consists of 1/16" TL particles arranged in the entire reactor volume. It is obvious from the data in FIG. 3 that solid deposition only occurs at the top of the catalyst bed. The type of deposition observed in FIG. 3 will result in clogging of the free void volume at the top of the bed, resulting in an increasing pressure drop (ΔP). The resistance against contamination in ungraded catalyst beds of the above type is low. The resistance is set relatively to 100% in order to allow comparison with other types of catalyst beds.

Comparison Example B

In order to improve resistance against contamination, high void material on the top of the reactor is conventionally used. This improves the capacity for deposition by smoothing the deposition profile. Furthermore, the high void material can secure large quantities of solids until the void volume is reduced to such an extent that a pressure drop occurs.

Figure 4:
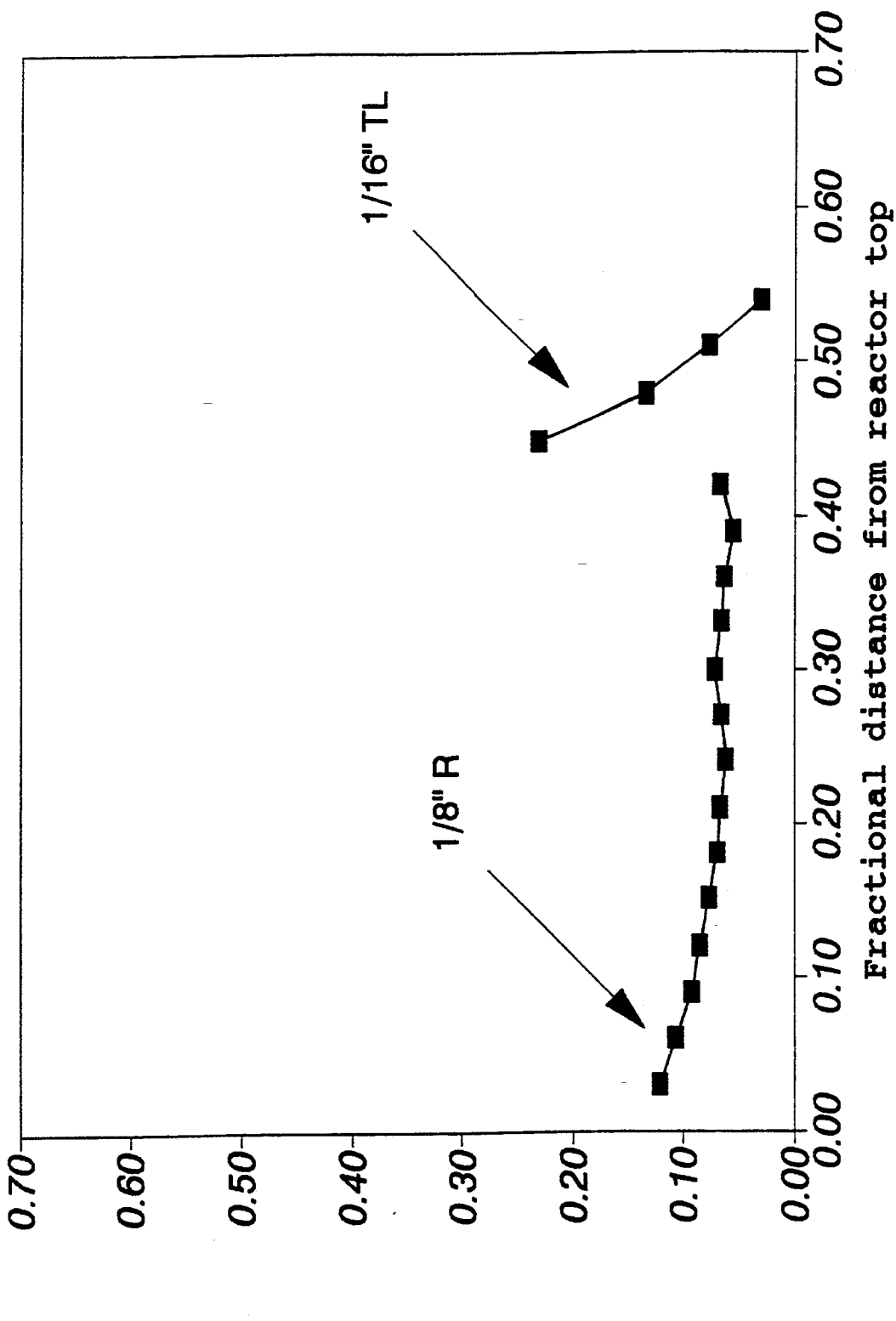
FIG. 4 shows the solids deposition profile in a catalyst bed consisting of a layer of ⅜" rings arranged on top of a layer of 1/16" threelobe particles.

In this Example a conventional two-layer grading was used, consisting of a layer of ⅛" rings arranged on top of a layer of 1/16" TL. FIG. 4 shows the deposition profiles obtained in the graded bed. It is observed that the deposition has improved as compared with Example A. However, it is also observed that there is a possibility of catalyst bed blocking on the boundary between the two layers, since a high deposition occurs at the top of the low void 1/16" TL layer. It is also in this boundary area that the reactor is most likely to be blocked. Resistance against contamination in this Example is stronger than found in Example A. As calculated by the above aquations, it is possible to accumulate 3.6 times more solids than in the catalyst bed of Example A.

EXAMPLE 2

The deposition of contaminants can be improved substantially by using the void grading technique according to the invention and described in Example 1. A graded catalyst bed was established having a top layer with 100% rings (size ⅛"), subsequent layers with a mixture of 85% rings and 15% threelobes (size 1/16")

and 48% rings and 52% threelobes, and at bottom a layer with 100% threelobes.

Figure 5:
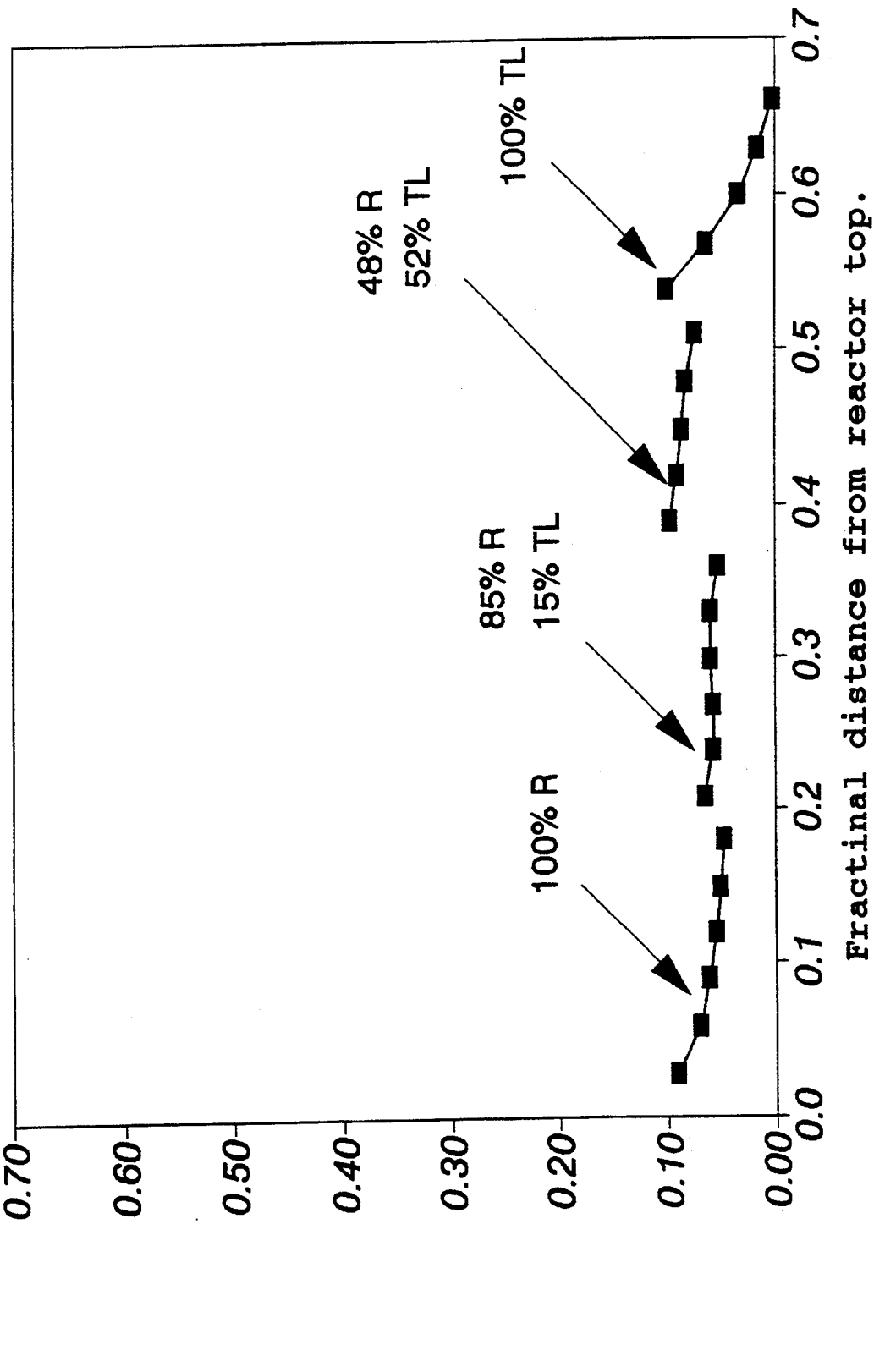
FIG. 5 shows the solids deposition profile in a catalyst bed according to the present invention.

FIG. 5 shows the contamination profile obtained for the void graded bed. The data obtained clearly demonstrate that the deposition profile obtained in the void graded bed allows a much higher contamination rate without clogging the catalyst bed.

Resistance against contamination is increased by 7.9 times as compared to that of a catalyst bed with only threelobe particles, as in Example A.

Void grading can, furthermore, be combined with activity grading by mixing particles with different catalyst activity. Activity grading is preferred in reactor the treatment of a feedstock, where solids are formed during catalytic reactions on the catalyst particles.

I claim:

1. Process for the hydrotreating of a hydrocarbon feedstock comprising passing the feedstock through a multilayered fixed bed hydrotreating catalyst system comprising two different shaped catalyst particles, one shape providing a large void volume and the other shape providing a low void volume, said particles being mixed in different ratios of said particle shapes in different layers of the catalyst bed, the proportion of shapes providing a low void volume increasing in the direction of feedstock flow.

2. The process of claim 1, wherein the catalyst particles providing a large void volume are selected from the group consisting of particles having the shape of rings, wagon wheels and bodies with a plurality of internal channels, and the catalyst particles providing a low void volume are selected from the group consisting of particles having the shape of cylinders, threelobes and spheres.

3. The process of claim 1, wherein the fixed bed catalyst system comprises successive layers of mixed ringshaped and threelobe particles, a layer of ringshaped particles and a layer of threelobe particles, the proportion of threelobe particles increasing in the direction of feedstock flow.

4. The process of claim 3, wherein the mixed layers consist of 85 wt % and 60 wt % ringshaped particles, respectively, mixed with threelobe particles.

5. The process of claim 3, wherein the mixed layers consist of 85 wt % and 48 wt % ringshaped particles, respectively, mixed with threelobe particles.

* * * * *